UNITED STATES PATENT OFFICE.

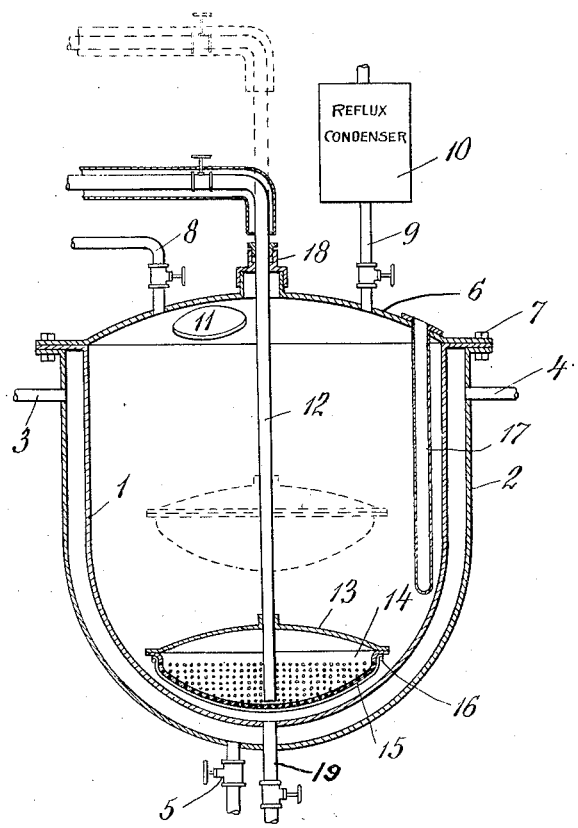

LLOYD C. DANIELS, OF BUFFALO, NEW YORK, ASSIGNOR TO NATIONAL ANILINE & CHEMICAL COMPANY, INC., OF NEW YORK, N. Y., A CORPORATION OF NEW YORK.

METHOD OF PURIFYING BENZANTHRONE.

1,365,024.     Specification of Letters Patent.     Patented Jan. 11, 1921.

Application filed January 9, 1920. Serial No. 350,335.

*To all whom it may concern:*

Be it known that I, LLOYD C. DANIELS, a citizen of the United States, residing at Buffalo, in the county of Erie, State of New York, have invented certain new and useful Improvements in Methods of Purifying Benzanthrone; and I do hereby declare the following to be a full, clear, and exact description of the invention, such as will enable others skilled in the art to which it appertains to make and use the same.

This invention relates to an improved method or process of purifying benzanthrone to recover the benzanthrone in a purified or pure state from impure products.

In the production of benzanthrone, for example by condensing anthroquinone and glycerin with the aid of sulfuric acid as a condensing agent, the product produced, after dissolving soluble constituents in water, is impure since it contains benzanthrone in admixture with various impurities. The nature and amount of the impurities will vary somewhat with the method of production, but these impurities may contain varying amounts of the following materials, namely, unchanged anthroquinone, a red, resinous substance, and a substance which is almost black when wet and is a brown powder when dry. The purification of the impure benzanthrone, accordingly, involves separating the benzanthrone from such impurities.

Various solvents have heretofore been proposed for use in the purification of benzanthrone, but these solvents are not entirely satisfactory. Thus, alcohol, acetone, and acetic acid, will take up large quantities of the black substance above referred to, and deposit it with the benzanthrone on cooling. These solvents also have a limited solvent power for the benzanthrone. Toluol and xylol likewise dissolve appreciable amounts of the black impurity and also of unchanged anthraquinone, and they hold a large part of the dissolved benzanthrone in solution on cooling, as does also nitro-benzol when used as a solvent, thus necessitating a recovery of the dissolved benzanthrone from the solvent.

The present invention is based upon the discovery that materially improved results can be obtained by carrying out the purification operation with the use of halogen derivatives of the simple aromatic hydrocarbons, and more particularly with chlorbenzol. One part of benzanthrone dissolves in about seven or eight parts of hot chlorbenzol, and almost all of it is deposited on cooling; whereas anthraquinone is much less soluble in the hot chlorbenzol (about $\frac{3}{10}$ of a part of anthraquinone in 10 parts of the hot solvent) and is separated on cooling only in amount sufficient to produce a cloudiness.

The improved process of the present invention, accordingly, comprises extracting the crude benzanthrone (*e g.*, in the form of the dried press-cake), with the hot chlorbenzol in amount about six to eight times the weight of the benzanthrone, filtering the resulting solution while hot from the undissolved impurities, and chilling the hot solution to a relatively low temperature (about 15° C. or lower) to bring about crystallization and separation of the benzanthrone which is then filtered off. The filtrate, containing but a small amount of benzanthrone, can be used for a second extraction or for repeated extractions of the same residue, or for extracting fresh amounts of the impure material. Owing to the differential solvent power of chlorbenzol for the benzanthrone and impurities, a relatively large amount of the benzanthrone is dissolved by the hot solvent, and relatively small amount of the impurities, so that the benzanthrone is obtained directly, even after a single crystallization, in a sufficiently purified state for use. It can be further purified by repeating the recrystallization from the same solvent.

The apparatus illustrated in the accompanying drawing is well adapted for the practice of the invention. This improved apparatus, which forms the subject matter of a separate application, Serial No. 350,334, filed of even date herewith, is made up of a receptacle or kettle 1 having suitable heating means such as a steam or oil jacket 2 with inlet and outlet pipes 3 and 4 and drain pipe 5, and is provided with a removable cover 6, secured by bolts or other fastening means 7 and having a pipe for compressed air or compressed gas 8 and a vapor outlet pipe 9 leading to a condenser 10. The cover 6 is also provided with a charging manhole 11 and with a thermometer well 17, as well as with a stuffing box 18 through which the vertical, adjustable pipe 12 passes. This pipe carries at its lower end a filter head made up of the upper sheet metal member 13 and the lower perforated sheet metal member 14 having a covering 15 of cloth or screen fabric secured in place by the clamping rod or wire 16. The receptacle is provided with a bottom discharge connection 19. This improved apparatus, which is more fully described and claimed in said companion application, forms no part of the present invention, but is well adapted for use in the practice of the improved process of the invention.

In the practice of this process, in the apparatus illustrated, the crude, impure benzanthrone (e. g. in the form of dried presscake) together with the chlorbenzol solvent, is charged into the apparatus through the manhole 11, for example, in the proportion of about thirty parts by weight of crude benzanthrone and one hundred and eighty parts by weight of chlorbenzene. The apparatus is heated by means of the heating jacket to the boiling point of the solvent (above 130° C.). After a few minutes' digestion, compressed air is admitted through the pipe 8, and the solution is blown out through the filter head and pipe 12 to a cooling receptacle, where the solution is chilled and the benzanthrone crystallized therefrom. The purified benzanthrone is then filtered off and the filtrate can be again returned to the apparatus for effecting a further extraction, and this operation can be repeated until the extraction of the benzanthrone is completed. Benzanthrone of a sufficient purity to melt at 166 to 170° C. has thus been obtained after a single crystallization.

The purified benzanthrone thus obtained can be further purified by subjecting it to a further extraction and recrystallization from the same solvent. Benzanthrone has been thus obtained having a melting point as high as 174.4° C., whereas the melting point referred to in the literature is 170° C.

Where the benzanthrone is accompanied with considerable amounts of unchanged anthraquinone, it is sometimes difficult to effect a separation, owing to the formation of a eutectic containing about 11 to 12% anthraquinone mixed with about 88 to 89% benzanthrone. If, however, the anthraquinone is less than about 11%, a pure benzanthrone can be obtained without difficulty.

It is one advantage of the use of chlorbenzol as a solvent that the brownish black impurities formed as a by-product during the production of the benzanthrone can be completely separated.

Instead of chlorbenzol, other halogen derivatives of the simple aromatic hydrocarbons can be similarly used, for example, brom-benzol, para-dichlor-benzol, the mixture of chlorinated benzols technically obtained upon freezing out para-dichlor-benzol, chlor-toluols, etc. When para-dichlorbenzol is used, it should preferably be mixed with an equal amount of chlorbenzol to prevent its separating out as a solid with the benzanthrone. The higher boiling points of these other halogenated hydrocarbons makes them less advantageous than chlorbenzol, and makes their recovery more difficult; and they are accordingly less to be recommended than is chlorbenzol itself.

The difference in solubility of benzanthrone in hot chlorbenzol and in cold chlorbenzol is so great that the benzanthrone tends to separate out from a hot saturated solution even upon a few degrees' lowering of temperature. It is therefore important to maintain the temperature of the hot solution until filtration from the undissolved impurities has taken place. The apparatus illustrated in the drawing is well adapted for this filtration and separation inasmuch as the filter head is arranged within the heated receptacle itself, and the pipe 12 leading to the outside of this apparatus is provided with a heat insulating covering or jacket to prevent cooling thereof. In using this apparatus, it is sometimes advantageous to raise the filter head, for example, to the position shown in dotted lines, until the extraction has taken place, and then to lower the filter head for the purpose of filtration. After the extraction of the benzanthrone has taken place, and after this extraction has been repeated if necessary, the residue can then be discharged from the apparatus through the bottom outlet 19 together with any admixed solvent, or the solvent can be distilled out of the residue by further heating or by steam distillation and the residue then sludged out with water.

I claim:

1. The method of purifying impure benzanthrone, which comprises dissolving the benzanthrone with hot halogen derivatives of aromatic hydrocarbons as solvents, separating the resulting hot solution from undissolved impurities, and cooling the solution to effect separation of the benzanthrone therefrom.

2. The method of purifying impure benzanthrone, which comprises dissolving the benzanthrone with hot chlorbenzol as a solvent, separating the resulting hot solution from undissolved impurities, and cooling the solution to effect separation of the benzanthrone therefrom.

3. The method of purifying impure benzanthrone, which comprises repeatedly recrystallizing the benzanthrone from chlorbenzol as a solvent.

4. The method of purifying benzanthrone, which comprises dissolving benzanthrone with hot chlorbenzol as a solvent, separating the resulting hot solution from undissolved impurities, cooling the solution to effect separation of the benzanthrone therefrom, recovering the chlorbenzol with its small amount of benzanthrone dissolved therein, and using the same for extracting further amounts of benzanthrone.

In testimony whereof I affix my signature.

LLOYD C. DANIELS.